United States Patent
Suda

(10) Patent No.: US 7,589,740 B2
(45) Date of Patent: Sep. 15, 2009

(54) PLANETARIUM PICTURE-CREATING APPARATUS AND PICTURE-CREATING METHOD THEREOF

(75) Inventor: Masaki Suda, Toyokawa (JP)

(73) Assignee: Konica Minolta Planetarium Co., Ltd., Osaka-shi (JP)

( * ) Notice: Subject to any disclaimer, the term of this patent is extended or adjusted under 35 U.S.C. 154(b) by 370 days.

(21) Appl. No.: 11/592,698

(22) Filed: Nov. 3, 2006

(65) Prior Publication Data

US 2007/0109311 A1    May 17, 2007

(30) Foreign Application Priority Data

Nov. 17, 2005    (JP)    ............... 2005-332289

(51) Int. Cl.
```
G09G 5/00      (2006.01)
G06F 3/01      (2006.01)
G06F 3/048     (2006.01)
G06K 9/32      (2006.01)
G06K 9/60      (2006.01)
G06T 13/00     (2006.01)
G06T 11/40     (2006.01)
```
(52) U.S. Cl. .............. 345/582; 345/473; 345/586; 345/619; 345/552; 715/700; 715/764; 715/800; 715/815; 382/254; 382/300; 382/305

(58) Field of Classification Search ......... 345/581–582, 345/586, 606, 619, 643, 660, 552, 574, 473; 715/200, 231, 700, 764, 770, 781, 788, 800, 715/815; 382/254, 276, 300, 305; 701/10, 701/13, 28, 75

See application file for complete search history.

(56) References Cited

U.S. PATENT DOCUMENTS

2006/0078214 A1 *  4/2006  Gallagher .............. 382/254
2006/0258450 A1 * 11/2006  Ishihata et al. ............ 463/31

FOREIGN PATENT DOCUMENTS

JP    2004-361584 A    12/2004

OTHER PUBLICATIONS

Product advertisement of "Super-Mediaglobe", published by Kabushiki Kaisha Astroart and sold by Kabushi Kaisha Askee, publication "Hoshi Have" Jun. 2005, w/partial English translation, 2 pgs.

* cited by examiner

Primary Examiner—Wesner Sajous
(74) Attorney, Agent, or Firm—Sidley Austin LLP

(57) ABSTRACT

A planetarium apparatus of this invention memorizes a plurality of texture image data expressing conditions of a surface of an object in a picture memory by relating to the range of a distance from a viewpoint to the object. One of the texture image data in the picture memory is read out in accordance with a distance from the viewpoint to the object and by adjusting its size a texture image on the basis of the texture image data read out is pasted to an area of the entire image occupied by the object. Further, a remaining portion is formed as a real time image. In consequence, when a take-off from, or a landing onto, the surface of a celestial body is represented, a picture in which the condition of surrounding cosmic space is reproduced in real time, and the surface pattern of the celestial body from which a take off, or onto which a landing can both be displayed with a high degree of quality.

21 Claims, 6 Drawing Sheets

PLANETARIUM PICTURE-CREATING APPARATUS AND PICTURE-CREATING METHOD THEREOF

CROSS-REFERENCE TO RELATED APPLICATIONS

This application is based upon and claims the benefit of priority from the prior Japanese Patent Application No. 2005-332289 filed on Nov. 17, 2005, the entire contents of which are incorporated herein by reference.

BACKGROUND OF THE INVENTION

1. Field of the Invention

The present invention relates to a planetarium picture-creating apparatus for projecting a picture such as a starry sky onto a dome screen on the basis of picture information, and a picture creating method thereof. More particularly the present invention relates to a planetarium picture-creating apparatus capable of representing movement in cosmic space as a pseudo space journey, and presenting activities such as take-offs from, and landings onto the surfaces of celestial bodies dramatically and a picture-creating method thereof.

Conventionally, a planetarium picture-projecting apparatus creates, projects and displays a picture of a starry sky on the basis of a manual operation including date-setting and viewpoint-setting. For example, if a pseudo space journey is represented, a process of changing the positions of celestial bodies along with changes of viewpoint is carried out (see, for example, JP Unexamined Patent Publication No.2004-361584). A product "super-MEDIAGLOBE" has a take-off and landing function (see the back face of the cover sheet of the monthly publication "HOSHI NAVI June 2005, edited and published by KABUSHIKI-KAISHA ASTROART and sold by KABUSHIKI KAISHA ASKEE). This is a function capable of facilitating the projection of situations in which movement takes places through a series of motions from the surface of a celestial body to airspace enabling a commanding view of that celestial body. And also, from airspace to the surface of the celestial body.

When a change of viewpoint is represented, for example, when a viewpoint approaches a celestial body or retreats from the celestial body, the size of an object displayed that expresses the shape of the celestial body changes commensurately with a distance from the viewpoint. In general terms, a surface pattern of a celestial body is prepared as a static image, a texture. So, the celestial body is expressed by pasting the texture onto the area where the object is displayed. Thus, during processing in which the size of an object changes, the static image is pasted in a state of enlargement or reduction with changes of the size of the object.

In animation contents of a pseudo space journey operated on a personal computer, a plurality of picture information is generally prepared that corresponds of movement between a first viewpoint and a second viewpoint. One of these pictures is expressed in an enlarged form corresponding to movement of the viewpoint. It is changed into the subsequent picture at a predetermined timing, and the picture in turn is expressed in an enlarged form. Consequently, animation contents corresponding to movement of a viewpoint from airspace some several tens of meters above ground level up to an altitude of an artificial satellite, or contents such as reproducing movement from the surface of the ground to cosmic space, have been achieved.

However, in the conventional planetarium picture-creating apparatus described above, only one texture has been prepared for each celestial body. Thus, if it is intended to express a condition in which a viewpoint is very close to the surface of the celestial body, an extremely enlarged image of the texture is displayed. For example, if travel from the surface of the earth into cosmic space by rocket is represented, an extremely enlarged image of the earth having a low degree of resolution is displayed in a situation in which the viewpoint is very close to the surface of the earth. Accordingly, a problem arises that such a picture is deficient in terms of a sense of realism and a high quality of presentation cannot be achieved.

Further, in the animation contents of a personal computer, only the surface texture of the earth is reproduced and conditions in cosmic space around the earth cannot be reproduced at the same time. Even if an animation picture is prepared for conditions in which cosmic space around the surface texture of the earth in advance, displayed pictures are limited to that from predetermined time on and from predetermined viewpoints. Thus, for these reasons, it cannot be expressed a condition of the sky in which bodies such as the sun, moon, planets, satellites, fixed stars and the milky way change, and a condition of the surface of the earth which is retreating at the same time.

SUMMARY OF THE INVENTION

The present invention has been accomplished in order to solve the problems expressed by the conventional planetarium picture-creating apparatus and picture-creating method. An object of the present invention is to provide a planetarium picture-creating apparatus, which when a take-off from, or landing onto the surface of a celestial body is represented, can display a picture in which conditions in surrounding cosmic space can be reproduced in real time, and in which the surface pattern of a celestial body on which a landing takes place, or from which a take off takes place, and a picture-creating method can be displayed with a high degree of quality.

According to a first aspect of the present invention, there is provided a planetarium picture-creating apparatus comprising: a real time computing portion for computing a position of a celestial body in real time; a texture image memory portion for memorizing a plurality of texture image data expressing conditions of a surface of an object by relating to a range of distances from a viewpoint to the object; a reading portion for reading out one of texture image data in the texture image memory portion, an item of data that corresponds to a distance from the viewpoint to the object; an area determining portion for determining an extent of an area to be occupied by the object in relation to an entire image, and corresponding to a distance from the viewpoint to the object; a picture creating portion which, on the basis of texture image data read out by the reading portion, pastes a texture image onto the area determined by the area determining portion while creating a remaining portion of the entire image as a real time image on the basis of a computation result of the real time computing portion; and a distance specifying portion for specifying a distance from the viewpoint used by the reading portion and the area determining portion up to the object.

In the planetarium picture-creating apparatus according to the first aspect of the invention, a plurality of texture image data expressing conditions of the surface of the object are memorized in a texture image memory portion. One of the texture image data that corresponds to a distance from a viewpoint to the object specified by the distance specifying portion is read out by the reading portion. The area determining portion determines the size of area occupied by the object in relation to the entire image. Then, the picture creating portion creates a planetarium picture in which the texture image is pasted to the area of the object while a real time image is pasted to the other area. Thus, when a take-off from, or a landing onto, the surface of a celestial body is represented, the picture in which conditions of surrounding cosmic space are reproduced and the surface pattern of a celestial body, from which a take off, or onto which a landing, takes place, can be displayed with a high degree of quality. The planetarium picture in this context can mean a starry sky image, a celestial body surface image or a synthesized image thereof.

According to a second aspect of the present invention, there is provided a planetarium picture-creating apparatus comprising: a real time computing portion for computing a position of a celestial body in real time; an animation memory portion for memorizing animation data expressing conditions of a surface of an object extending from a view from a near distance to a view from an intermediate distance; a near-distance picture creating portion for creating a projection image from animation on the basis of animation data in the animation memory portion; an area determining portion for determining an extent of an area to be occupied by the object in relation to an entire image, and corresponding to a distance from the viewpoint to the object; an intermediate-distance picture creating portion which, on the basis of animation data in the animation memory portion, pastes animation to the area determined by the area determining portion by adjusting a size, while creating on the remaining portion of the entire image a projection image as a real time image on the basis of a result of computation of the real time computing portion; a far-distance picture creating portion for creating a projection image from the real time image on the basis of a result of computation by the real time computing portion; a switching control portion which switches the near-distance picture creating portion, the intermediate-distance picture creating portion and the far-distance picture creating portion on a basis of a distance from the viewpoint to the object; and a distance specifying portion for specifying a distance from the viewpoint used by the switching control portion and the area determining portion to the object.

The condition of the surface of the object is expressed by applying animation, rather than pasting the texture. A near-distance picture creating portion, an intermediate-distance picture creating portion and a far-distance picture creating portion can be used interchangeably, depending on the distance between the viewpoint and the object specified by the distance specifying portion. The near-distance picture creating portion creates a planetarium picture with animation of the object at a near distance. The intermediate-distance picture creating portion creates a planetarium picture in which animation is applied to the object area when a real time image has been bonded to the other area. The far-distance picture creating portion creates a planetarium picture from the real time image. Therefore, when a take-off from, or a landing onto, the surface of a celestial body is represented, a picture in which conditions of surrounding cosmic space are reproduced in real time, and the surface pattern of the celestial body from which a take off, or onto which a landing, takes place can be expressed with a high degree of quality.

According to a third aspect of the present invention, there is provided a planetarium picture-creating method comprising: memorizing in advance a plurality of texture image data expressing conditions of a surface of an object by relating them to a range of distances from a viewpoint to the object; specifying a distance from the viewpoint to the object on the basis of a manual operation by an operator; reading one of the texture image data corresponding to a distance specified; determining an extent of an area occupied by the object in relation to the entire image, in accordance with the distance specified; computing the position of a celestial body in real time; and, on the basis of texture image data read out, pasting a texture image to the area determined by adjusting a size while forming a remaining portion of the entire image as a real time image on the basis of a computation result relating to the position of the celestial body.

According to a fourth aspect of the present invention, there is provided a planetarium picture-creating method comprising: memorizing in advance animation data expressing conditions of a surface of an object extending from a view from a near distance to a view from an intermediate distance; specifying a distance from a viewpoint to the object on the basis of a manual operation by an operator; determining an extent of an area occupied by the object in relation to the entire image, in accordance with the distance specified; computing the position of a celestial body in real time; if the distance specified is within a range of a predetermined near-distance, creating a projection image from animation on the basis of animation data; if the distance specified is within a range of a predetermined intermediate-distance, on the basis of animation data, pasting animation to the area determined by adjusting a size while creating for a remaining portion of the entire image, a projection image as a real time image on the basis of a result of computation about the position of the celestial body; if the specified distance is within a range of a predetermined far-distance, creating a projection image on the basis of a result of computation about the position of the celestial body; and automatically switching the projection image of the near-distance, intermediate-distance and far-distance in accordance with the distance specified.

According to the planetarium picture-creating apparatus and the picture creating method of the present invention, when a take-off from, or a landing onto, the surface of a celestial body is represented, a picture in which conditions of surrounding cosmic space is reproduced in real time, and the surface pattern of the celestial body from which a take off, or onto which a landing, is to take place can be expressed with a high degree of quality.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENT

First Embodiment

Hereinafter, the first embodiment of the present invention will be described in detail with reference to the accompanying drawings. This embodiment is an embodiment of the present invention that results from applying a digital type planetarium apparatus for projecting pictures such as a starry sky onto a dome screen on the basis of picture information.

Figure 1:
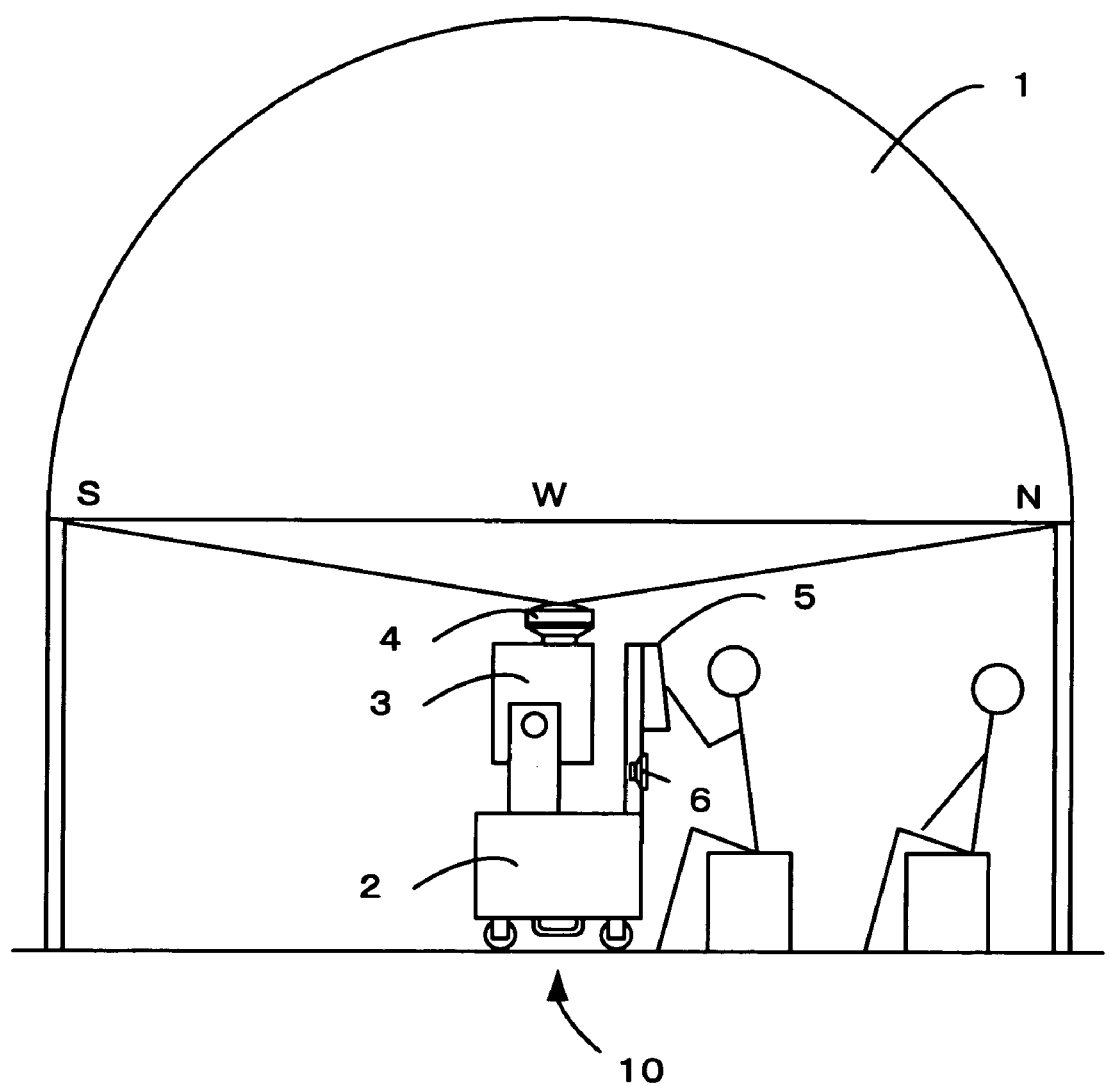
FIG. 1 is a schematic structure drawing of a planetarium apparatus of this embodiment.

The planetarium apparatus of this embodiment comprises a dome screen 1, and a projecting unit 10 that is installed at the bottom of the center of the dome screen 1, as shown in FIG. 1. The projecting unit 10 comprises a picture control portion 2, a picture-projecting portion 3, a fish-eye lens 4, an operating portion 5 and a loudspeaker 6. The picture control portion 2 controls features such as pictures that are projected onto the dome screen 1 and sounds that are provided within the planetarium facility. Pictures are projected onto the entire face of the dome screen 1 through the picture projecting portion 3 and the fish-eye lens 4. Sound is provided within the planetarium facility through the loudspeaker 6. The operating portion 5 is an operation panel for enabling an operator to operate the planetarium apparatus, and, for example, a touch panel can be made available. The operating portion 5 includes items such as a power switch, a program start key and a stop key.

Figure 2:
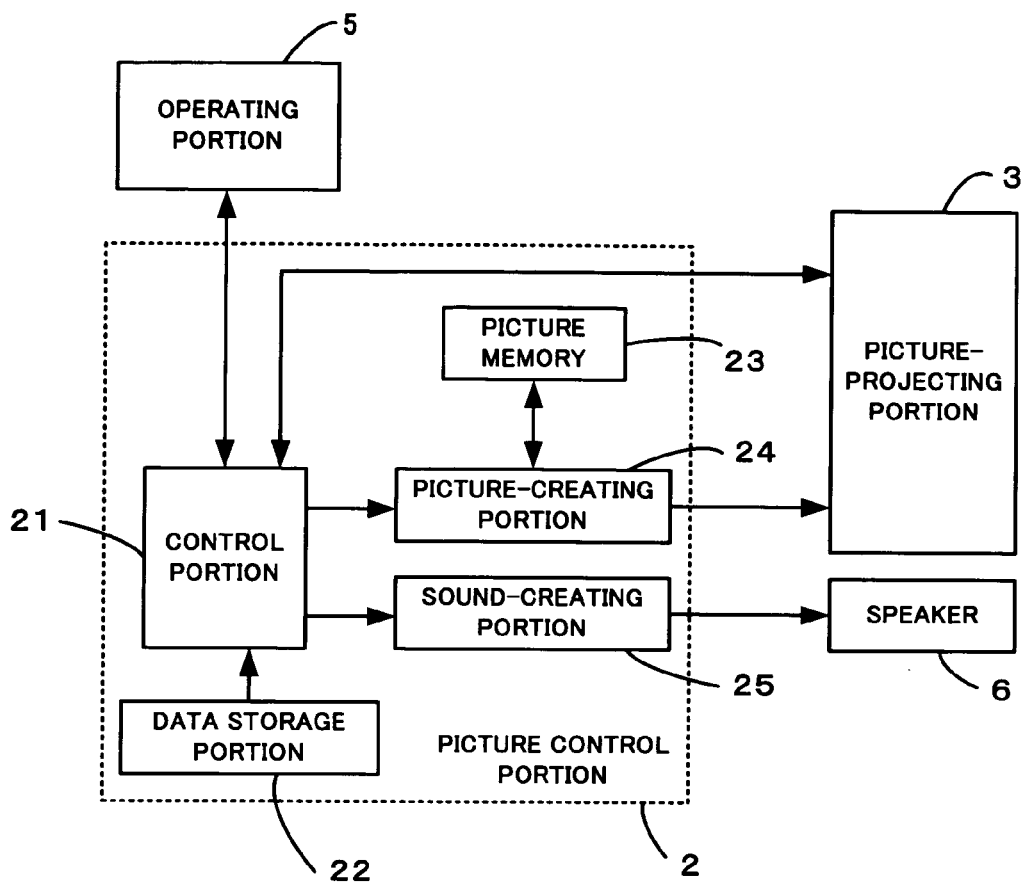
FIG. 2 is a block diagram illustrating the system structure of the planetarium apparatus of this embodiment.

The picture control portion 2 of the planetarium apparatus shown in FIG. 1 comprises a control portion 21, a data storage portion 22, a picture memory 23, a picture-creating portion 24, and a sound-creating portion 25, as shown in FIG. 2. The control portion 21 controls features such as pictures, sounds and illumination in accordance with instructions such as from the operating portion 5. The data storage portion 22 and the picture memory 23 store a variety of data that is necessary for control and files for features such as pictures and sounds that are necessary for the projection of pictures. The picture-creating portion 24 creates pictures that are projected onto the dome screen 1. A picture that has been created is sent to the picture-projecting portion 3 and projected onto the dome screen 1. The sound-creating portion 24 creates sounds that are provided inside the planetarium facility. A sound that has been created is provided within the planetarium facility by means of the loudspeaker 6.

In general terms, data stored in the data storage portion 22 includes the brightness of each celestial body, information about intrinsic motion and the names and arrays of each constellation. The files stored in the picture memory 23 include items such as photographs of celestial bodies, constellation pictures, and the textures of the surfaces of celestial bodies. The texture of a celestial body is memorized as a pattern of the entire surface of each celestial body, (for example, the striped pattern of Jupiter).

The planetarium apparatus of this embodiment can project onto the dome screen a starry sky which can be seen from a certain point, by means of specifying, for example, a date and a place (a point on the ground) through the operating portion 5. At such times, a position and an apparent size of each celestial body are computed in the control portion 21 on the basis of data such as the brightness and the pathways of each celestial body. This computation is carried out in real time corresponding to factors such as time settings, and movements of viewpoints based on the manual operations of operators. The picture-creating portion 24 creates a real time picture based on the results and projects it onto the dome screen 1.

Wherein a real time image obtained in such a way, if an object such as a planet is projected and displayed in only a luminous point, the object is deficient in terms of a sense of realism. As for an object scheduled to be projected in a large size, a texture which is a surface pattern is memorized in the picture memory 23. After the array and apparent size of the object have been computed, the texture is enlarged or contracted commensurately with that size and pasted. If the object is the earth, this texture is a terrestrial pattern as observed in a terrestrial globe. This texture is the same as that used conventionally and hereinafter, this texture will be described as the normal texture of the object. Further, the object mentioned here is an object which can be recognized in a starry sky. The object is not limited to celestial bodies but may be an artificial object such as a huge space station.

Figure 3:
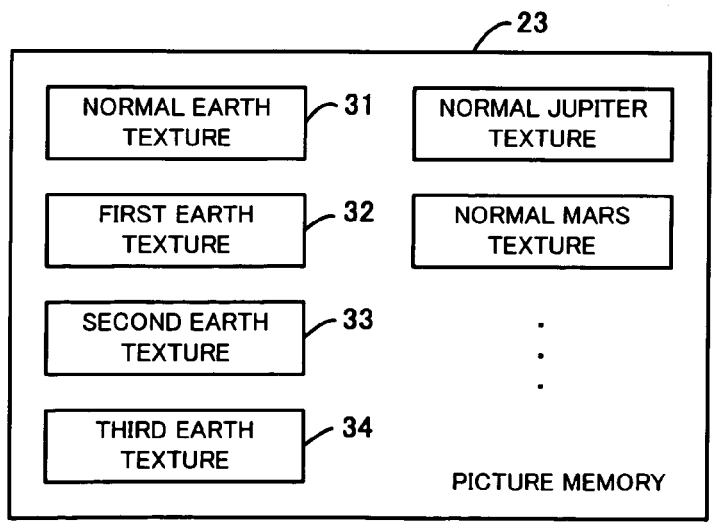
FIG. 3 is an explanatory diagram illustrating an example of a picture memory according to a first embodiment.

The normal texture is usually of a relatively low degree of resolution. Thus, if it is enlarged to such an extent that the greater part of the dome screen 1 is occupied by the earth, the picture projected becomes blurred and is deficient in terms of a sense of realism. Thus, in this embodiment higher resolution textures have been prepared so that the pattern of the earth, as seen from the altitude of an artificial satellite, or a pattern of a ground surface, as observed when one looks down from the peak of a high mountain can be expressed. As illustrated in FIG. 3, in addition to the normal earth texture 31 as earth textures, the picture memory 23 stores three other kinds of textures (a first earth texture 32, a second earth texture 33 and a third earth texture 34), each having a different resolution. This figure also exemplifies textures of a number of other celestial bodies.

Because a more detailed aspect of a surface can be observed the closer one approaches to a celestial body, it is preferable to use a high resolution texture for projection of pictures that relate to viewpoints at a lower altitude. On the other hand, holding of high resolution textures about the entire surfaces of celestial bodies is not desirable because the requisite data capacity increases to an excessive degree. Thus, the first to third earth textures, respectively 32 to 34, of this embodiment contain picture data of only a range required for projection and display. This range is explained next.

Figure 4:
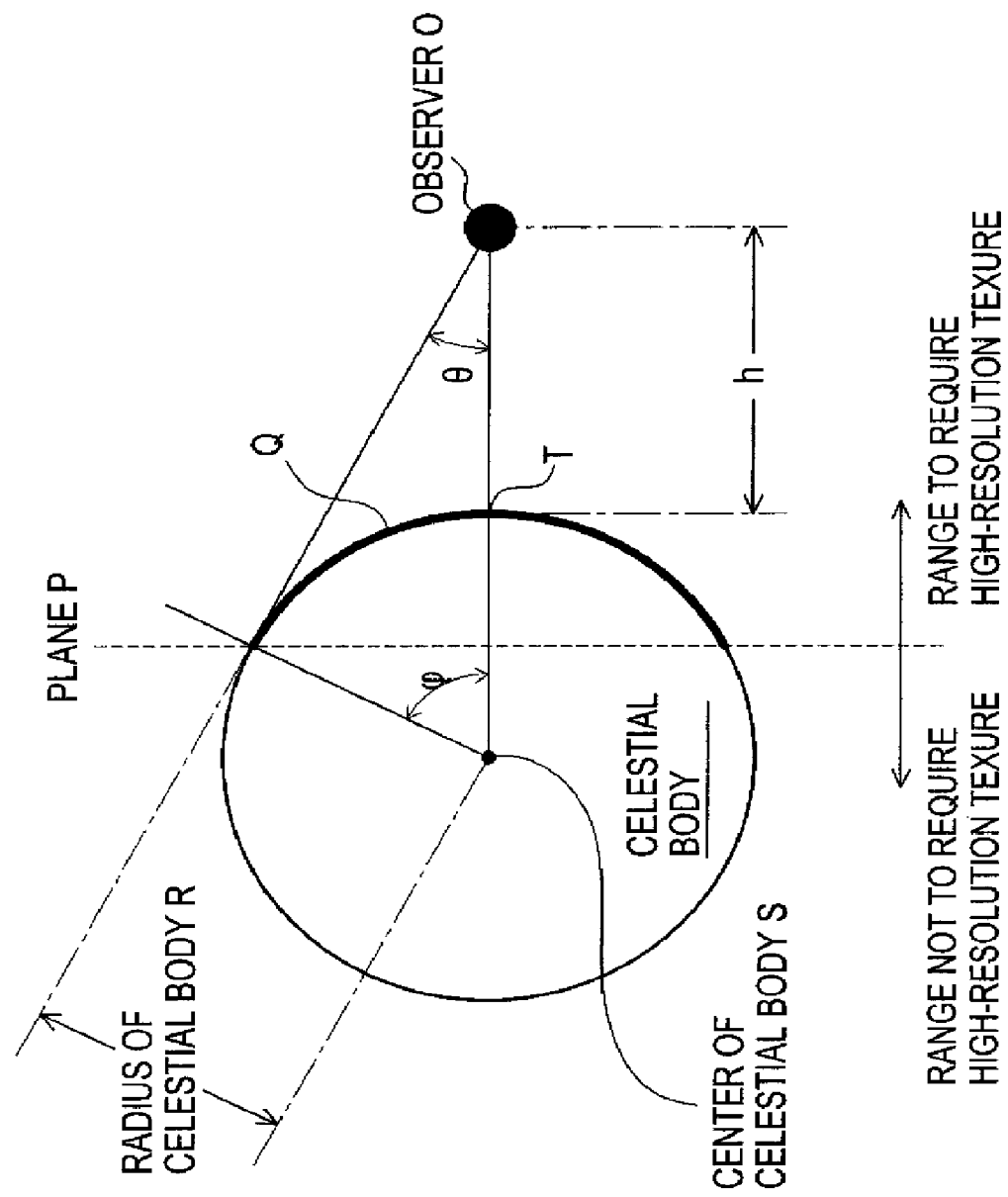
FIG. 4 is an explanatory diagram illustrating the range of a texture prepared.

As shown in FIG. 4, the maximum range of a surface of a celestial body which can be seen from the viewpoint of an observer O is a spherical portion Q that is surrounded by a face which passes the observer O and makes contact with the celestial body (forming a side face of a cone). In FIG. 4, a range corresponding to this spherical portion Q is represented by a bold line. If the altitude of an observer from the surface of the earth is expressed as h, there is presented the following relation. Here R is the radius of the celestial body, using an angle θ within FIG. 4.

$$(h+R)*\sin\theta = R$$

Using an angle φ in this Figure, the relationship can be expressed:

$$h = [(1/\sin(90°-\phi))-1]*R \ (0°<\phi<90°).$$

In other words, as a texture corresponding to the specified angle φ, only a range of the spherical portion Q corresponding to φ needs to be prepared. This is a portion on the side of the observer when spherical face of the celestial body, as shown in FIG. 4, is cut out with a plane P that is perpendicular to the drawing. In the planetarium apparatus of this embodiment, picture data having resolutions corresponding to each of φ1, φ2, φ3 (φ1<φ2<φ3) have been created within the range of the spherical portions Q of each, as the first earth texture 32, the second earth texture 33 and the third earth texture 34. Furthermore, the normal earth texture 31 has been prepared over its entire spherical surface.

Even if a texture is enlarged or contracted within a range in which φ is to some extent changed, a sense of realism is not lost. Now, assuming that an altitude of the observer O from the ground corresponding to each of φ1, φ2, φ3 is represented as h1, h2, h3, the first earth texture 32 is used, by means of appropriate enlargement within a near distance range in which the altitude of the viewpoint is between the ground (h=0) and altitude h1, the second earth texture 33 is used within an intermediate distance range of between h1 and h2 in terms of altitude of viewpoint, and the third earth texture is used within a far distance range of between h2 and h3 in terms of altitude of viewpoint. In this context, 0<h1<h2<h3. A real time image is used when a predetermined altitude h3 is exceeded, and the normal earth texture 31 is used in an appropriate enlargement.

For example, consider setting a departure point T at a single point on the earth as shown in FIG. 4, and representing departure into cosmic space by an ascent in a perpendicular direction (rightward direction in the Figure). In this representation from departure to altitude h1, the first earth texture 32 is used by reducing the size gradually from its enlarged state. In a representation of landing from altitude h1, the first earth texture is displayed by enlarging gradually. In consequence, a natural picture can be displayed as a scene near the surface of the earth. Likewise, an appropriate texture that depends on altitude is displayed within the object by enlargement or reduction. Moreover, if there is any portion other than the object, a real time image of the starry sky can be displayed in that portion. Consequently, space travel marked by an abundant sense of realism can be represented.

Next will be described a processing according to planetarium apparatus of this embodiment for representing movement of the viewpoint from the surface of the earth to cosmic space. First, at a time of expressing the condition of a starry sky which an observer sees at a time that he or she looks upward from the surface of the earth, the center of direction of a line of vision is upward in the perpendicular direction. Thus, only the hemispherical portion above the horizontal line is projected onto the dome screen 1. Thus, in this condition, the surface of the earth is never projected. If a departure from the surface of the earth is represented by the direction of a line of vision maintained in an upward direction, a sense of departure cannot be felt and no sense of realism can accordingly be obtained. Thus, the direction of a line of vision is turned downward of the horizontal line before departure. As a result, the condition of the surface of the earth needs to be projected.

A case will now be described in which a program is projected containing a representation of movement of a viewpoint from a few or several tens of meters above Tokyo Tower, to several kilometers into the sky. First, the position of an observer is set at the longitude and latitude of Tokyo Tower. Reproduction start time is set to an arbitrary date and time. As a consequence, the starry sky above Tokyo Tower can be represented as a real time image. Ordinary representation, such as progression of time and display of a constellation line or a constellation picture can be achieved. An operator can display a desired picture on the dome screen 1 by operating the operating portion 5, and provide a verbal commentary through the loudspeaker 6.

Figure 5:
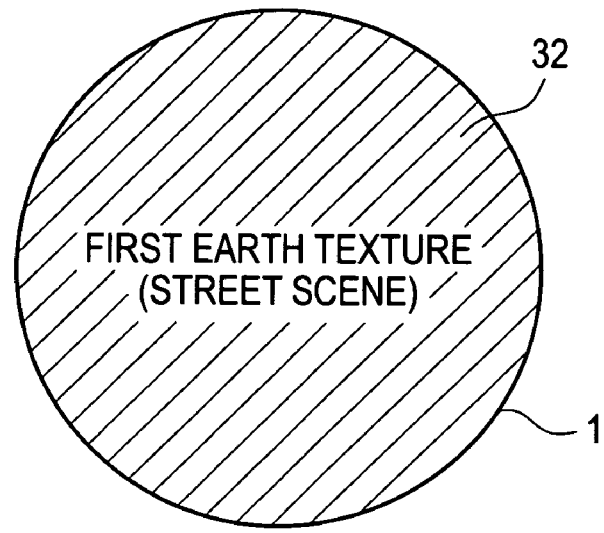
FIG. 5 is an explanatory diagram illustrating a condition in which the texture is indicated.

Next, at a time of representing a take-off, an operator changes the direction of a line of vision by operating the operating portion 5 so as to lower the line of the vision until the surface of the earth comes into the hemisphere of the field of vision. Because, at this time, altitude h of the viewpoint position of the viewpoint is located very close to the surface of the earth, the first earth texture 32 is enlarged to a predetermined size and projected as shown in FIG. 5. In this display, for example, a street scene such as the tops of buildings and trees in parks become visible. This first earth texture 32 may include a variety of data depending on the contents of the representation to be set as an area in which the planetarium apparatus is installed, or as a take-off location.

Next, an operator can change a position of a viewpoint by operating the operating portion 5 while representing the take-off by use of sound or the like so as to raise altitude h of the position of the viewpoint gradually. While the operator does so, the object (in this case the earth) is contracted gradually while the angle φ increases gradually. If altitude h of the position of the viewpoint is within a range of 0≦h<h1, the rate of enlargement of the first earth texture 32 is decreased gradually and a condition of retreating gradually can be projected.

Figure 6:
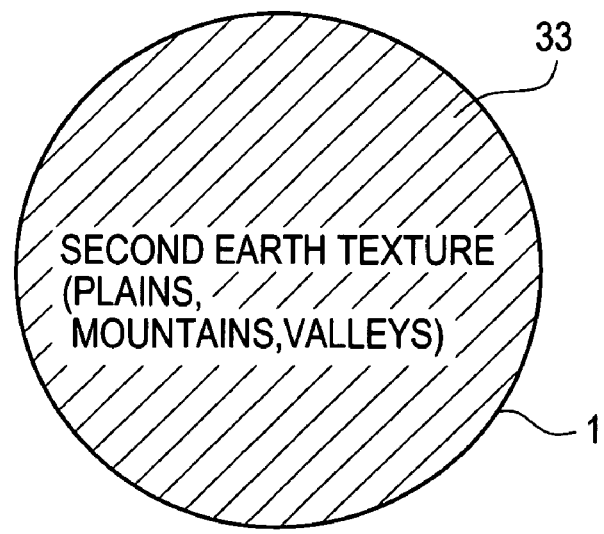
FIG. 6 is an explanatory diagram illustrating a condition in which the texture is indicated.

Moreover, when altitude h of the position of the viewpoint reaches h1, display of the first earth texture 32 is automatically suspended, and it is replaced by the second earth texture 33, as shown in FIG. 6. At this time, the second earth texture 33, appropriately enlarged, is projected. In this way, display is adjusted so that there is no sense of disharmony at the time of texture exchange. In this condition, for example, a scene which is visible from the sky at about 1000 meters above is projected, and a picture is displayed in which features such as plains, valleys, mountains, rivers, and the seashore lines can be distinguished.

Figure 7:
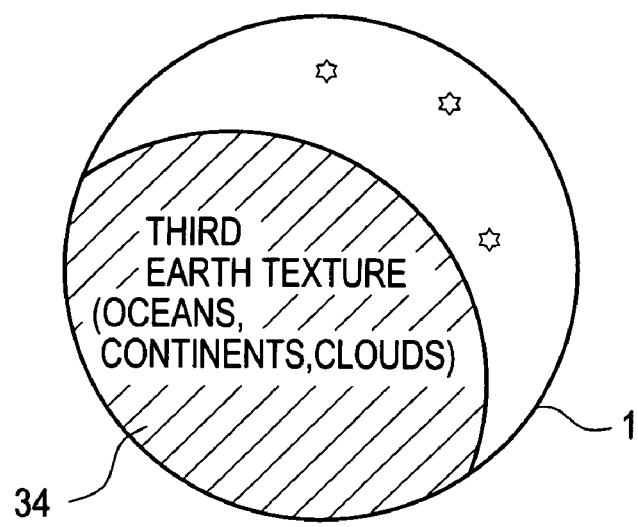
FIG. 7 is an explanatory diagram illustrating a condition in which the texture is indicated.
Figure 8:
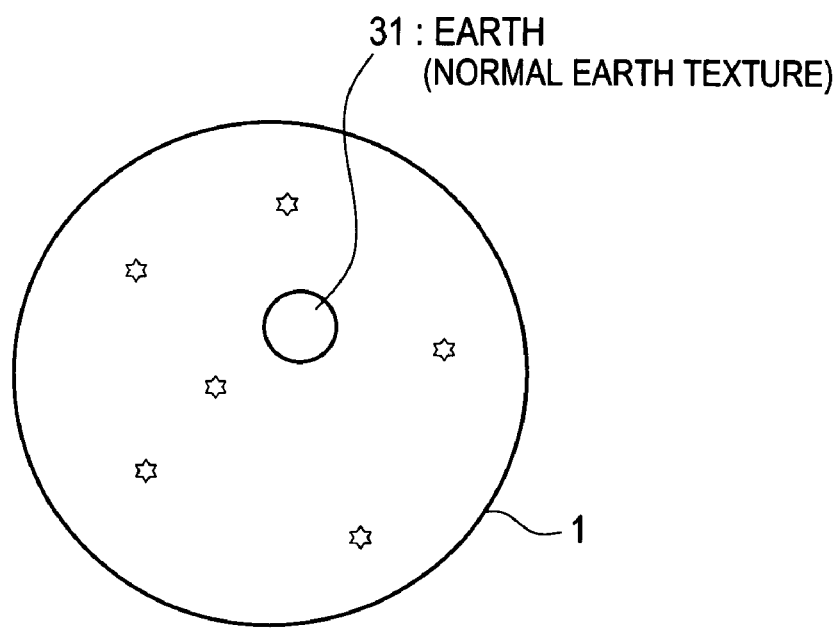
FIG. 8 is an explanatory diagram illustrating a condition in which the texture is indicated.

If the position of the viewpoint exceeds altitude h2 as a result of an operation made by an operator, the second earth texture 33 is automatically replaced by the third earth texture 33, and a picture is projected in which features such as continents, oceans, clouds can be distinguished. Cosmic space other than the earth then comes into the range of the field of vision, as shown in FIG. 7. At such times, a normal planetarium real time picture is created. Moreover, a starry sky defined by a setting date can be displayed by synthesization in a portion other than the earth. As regards objects other than the earth, a size which is displayed calculated according to a distance from the viewpoint at that time, and a normal texture is pasted.

When the viewpoint retreats further away from the earth, and for example, exceeds an altitude of 20,000 kilometers, the representation in the planetarium is performed with real time images in which the normal earth texture 31 is used. When a range in which the earth is displayed is determined, as shown in FIGS. 5-8, not only altitude h of the position of the viewpoint but also the direction of the line of vision, ought to be considered. Moreover, within an area occupied by the earth within the field of vision, an appropriate texture that corresponds to altitude h is pasted.

In other words, altitude h of the position of the viewpoint is operated manually by the operator through the operating portion 5. Thus, operations such as for example, a quick feed, a return feed, and a temporary stop are possible. Because, in accordance with these operations, the texture is automatically enlarged or contracted, or replaced, changes of texture themselves do not need to be executed manually.

Further, representations of landings on earth, or approaches up to very close positions, are possible. If this representation is executed, from a time that an altitude above the earth becomes lower than h3, the normal earth texture 31 is replaced by the third earth texture 33. If the viewpoint gets any close, the texture is enlarged gradually, or replaced by another texture, and its surface pattern is displayed. If a representation is made of an approach to a celestial body other than the earth, a variety of textures about that celestial body needs to be prepared in advance.

Because the planetarium apparatus of this embodiment as described contains a plurality of textures for special celestial bodies that have each been prepared with a high degree of resolution, even when a viewpoint is very close to that celestial body, a clear picture can be displayed. Further, the volume of requisite data need is not increased excessively because only the range of textures necessary for representation is memorized. Thus, processing relating to the texture can be executed smoothly and in parallel to creation of real time images. According to this planetarium apparatus, an image can be displayed in which conditions in nearby cosmic space can be reproduced in real time, and according to which this image and the surface pattern of a celestial body from which a take off or on which a landing, takes place, are both of a high quality so as to provide a high level of sense of realism.

Second Embodiment

Hereinafter, the second embodiment of the present invention will be described in detail with reference to the accompanying drawings. This embodiment is an embodiment of the present invention that results from applying a digital type planetarium apparatus for projecting pictures such as starry sky onto a dome screen on the basis of picture information. The composition of the planetarium apparatus of this embodiment is substantially the same as for the first embodiment and therefore, a description thereof will now be omitted.

Figure 9:
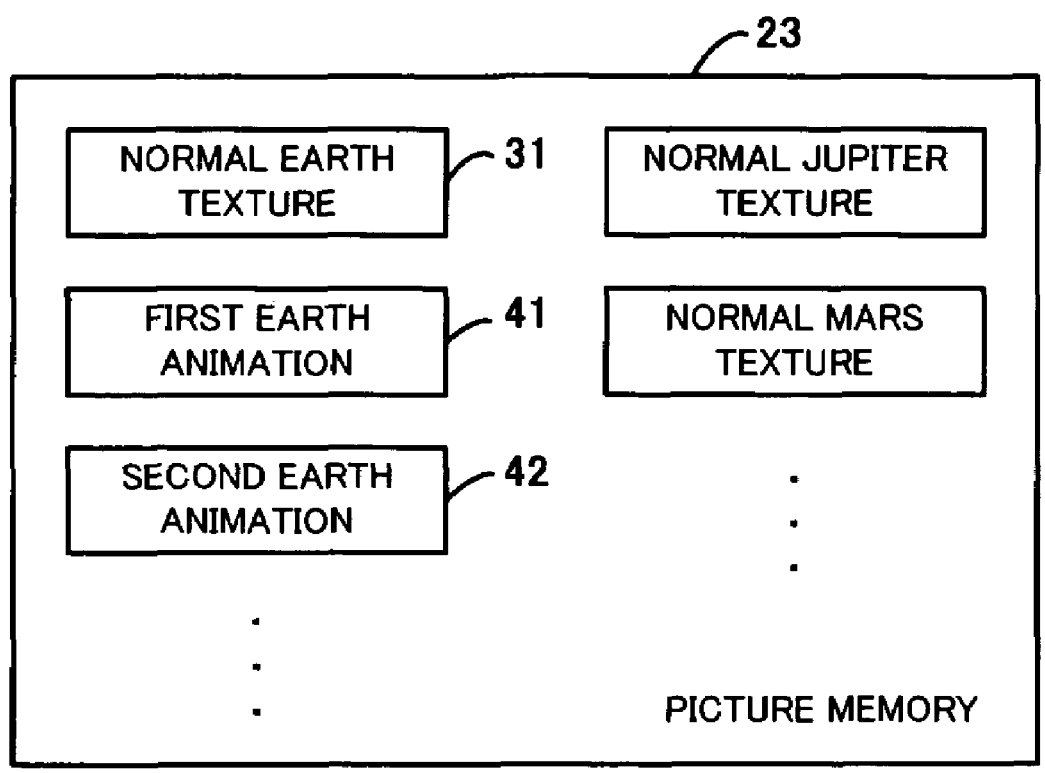
FIG. 9 is an explanatory diagram illustrating an example of the contents of the picture memory according to a second embodiment.

In the planetarium apparatus of this embodiment, as shown in FIG. 9, instead of high resolution textures, plural kinds of animation data having varying degrees of resolution corresponding to altitude are memorized in the picture memory 23. This figure illustrates an example in which are prepared a first earth animation 41 and a second earth animation 42. In the first earth animation 41, the condition of the surface of the earth is reproduced extending between a view from a near distance and a view from a first intermediate distance. In the second earth animation 42, the condition of the surface of the earth is reproduced extending between a view from the first intermediate distance and a view from a second intermediate distance which is farther.

For example, the first earth animation 41 may be an animation which contains smoke at a time of take-off or landing, and movements of objects such as automobiles near a place of take-off or landing. Pictures corresponding to FIGS. 5, 6 can be expressed with this first earth animation 41. The first earth animation 41 is displayed appropriately in enlargement or reduction within a range in which the earth is displayed in the planetarium picture. Moreover, movements of the viewpoint that correspond with representation of a take-off can be expressed by displaying the animation gradually during reduction. By preparing an animation containing movements of a viewpoint from take-off up to a degree of altitude, take-off can be represented only by reproducing that animation.

Further, the second earth animation 42 may contain movements of clouds relative to continents and oceans. These animations are displayed reducing gradually, or by varying the position in accordance with the direction of a line of vision. A real time image is synthesized for portion other than the earth so as to create a picture similar to FIG. 7. As a result, representation is possible in which an even greater sense of realism is created. Further, pictures corresponding to FIGS. 5-7 may be displayed continuously with a single animation data. In this embodiment also, a switch can be made to comprehensive projection of real time images when altitude increases further and the size of the earth develops into a state of a far distance view.

Naturally, with regard to the altitude h of the viewpoint on each occasion, the first earth animation 41 and the second earth animation 42 need only to cover the range of the spherical portion Q described in FIG. 4. Exchange and reproduction of the first earth animation 41 and the second earth animation 42 are carried out automatically on the basis of an operation by an operator at altitude h.

As described above, according to the planetarium apparatus of this embodiment also, a picture is displayed in which the condition of nearby cosmic space is reproduced in real time, and the surface pattern of a celestial body from which a take off, or on which a landing, takes place, is of a high quality when the take-off from, or the landing onto, the surface of the celestial body is represented, thereby securing a high level of a sense of realism.

Further, this embodiment is only one exemplification and in no sense restricts the present invention. Therefore, the present invention may naturally be improved or modified in various ways within a range in which there is no departure from the spirit of the invention.

For example, the object for which a plurality of textures is memorized need not be restricted to the earth, and a surface pattern that is different from a real one is permissible. It is permissible to memorize both animation and texture and to make replacements on the basis of distance. For example, as illustrated in FIG. 7, an animation containing movements of clouds may be expressed by overlapping them on a texture containing pictures of oceans or continents. Further, although the respective embodiments have been described as a planetarium apparatus which projects pictures onto the dome screen 1, the present invention can be applied to projecting onto a screen other than the dome-type screen, and to displaying on a personal computer display.

Further, in the present invention, the distance-specifying portion preferably specifies a distance on the basis of a manual operation of an operator. Consequently, an operator can specify a distance that corresponds to the reactions of an observer.

Further, in the present invention, texture image data memorized in the texture image memory portion preferably covers a range which can be seen from a viewpoint at a related distance on the surface of the object. Further, the texture image data memorized in the texture image memory portion preferably has a resolution that is commensurately lower as the related distance increases. In this configuration, the volume of data can be restricted to a modest amount because picture data within a range which cannot be seen from the viewpoint does not need to be memorized. Because the apparent size of an object decreases commensurately with increases in distance from the viewpoint to the object, there is no sense of disharmony even in pictures having a low degree of resolution.

The animation data memorized in the animation memory portion preferably covers a range which, on the surface of the object, can be seen when the viewpoint moves over a distance to the object.

What is claimed is:
1. A planetarium picture-creating apparatus comprising:
   a real time computing portion for computing a position of a celestial body in real time;
   a texture image memory portion for memorizing a plurality of texture image data expressing conditions of a surface of an object by relating to a range of distances from a viewpoint to the object;

a reading portion for reading out one of texture image data in the texture image memory portion, an item of data that corresponds to a distance from the viewpoint to the object;

an area determining portion for determining an extent of an area to be occupied by the object in relation to an entire image, and corresponding to a distance from the viewpoint to the object;

a picture creating portion which, on the basis of texture image data read out by the reading portion, pastes a texture image onto the area determined by the area determining portion while creating a remaining portion of the entire image as a real time image on the basis of a computation result of the real time computing portion; and a distance specifying portion for specifying a distance from the viewpoint used by the reading portion and the area determining portion up to the object.

2. The planetarium picture-creating apparatus according to claim 1 wherein the distance specifying portion specifies a distance on the basis of a manual operation by an operator.

3. The planetarium picture-creating apparatus according to claim 1 wherein the texture image data memorized in the texture image memory portion covers a range capable of being seen from the viewpoint at a distance related to the surface of the object.

4. The planetarium picture-creating apparatus according to claim 2 wherein the texture image data memorized in the texture image memory portion covers a range capable of being seen from the viewpoint at a distance related to the surface of the object.

5. The planetarium picture-creating apparatus according to claim 1 wherein the texture image data memorized in the texture image memory portion has a degree of resolution that becomes lower commensurately with increases in a related distance.

6. The planetarium picture-creating apparatus according to claim 2 wherein the texture image data memorized in the texture image memory portion has a degree of resolution that becomes lower commensurately with increases in a related distance.

7. The planetarium picture-creating apparatus according to claim 3 wherein the texture image data memorized in the texture image memory portion has a degree of resolution that becomes lower commensurately with increases in a related distance.

8. The planetarium picture-creating apparatus according to claim 4 wherein the texture image data memorized in the texture image memory portion has a degree of resolution that becomes lower commensurately with increases in a related distance.

9. The planetarium picture-creating apparatus according to claim 1 wherein the texture image data memorized in the texture image memory portion includes:

near-distance earth image data in which scenes of streets on earth as an object are drawn;

intermediate-distance earth image data in which geographic forms on earth as an object are drawn; and far-distance earth image data in which shapes of continents and oceans on earth as an object are drawn.

10. A planetarium picture-creating apparatus comprising:

a real time computing portion for computing a position of a celestial body in real time;

an animation memory portion for memorizing animation data expressing conditions of a surface of an object extending from a view from a near distance to a view from an intermediate distance;

a near-distance picture creating portion for creating a projection image from animation on the basis of animation data in the animation memory portion;

an area determining portion for determining an extent of an area to be occupied by the object in relation to an entire image, and corresponding to a distance from the viewpoint to the object;

an intermediate-distance picture creating portion which, on the basis of animation data in the animation memory portion, pastes animation to the area determined by the area determining portion by adjusting a size, while creating on the remaining portion of the entire image a projection image as a real time image on the basis of a result of computation of the real time computing portion;

a far-distance picture creating portion for creating a projection image from the real time image on the basis of a result of computation by the real time computing portion;

a switching control portion which switches the near-distance picture creating portion, the intermediate-distance picture creating portion and the far-distance picture creating portion on a basis of a distance from the viewpoint to the object; and a distance specifying portion for specifying a distance from the viewpoint used by the switching control portion and the area determining portion to the object.

11. The planetarium image-creating apparatus according to claim 10 wherein the distance specifying portion specifies a distance on the basis of a manual operation by the operator.

12. The planetarium picture-creating apparatus according to claim 10 wherein the animation data memorized in the animation memory portion covers, out of the entire surface of the object, a range capable of being seen over a distance up to the object from a viewpoint at a given point in time.

13. The planetarium picture-creating apparatus according to claim 11 wherein the animation data memorized in the animation memory portion covers, out of the entire surface of the object, a range capable of being seen over a distance up to the object from a viewpoint at a given point in time.

14. The planetarium picture-creating apparatus according to claim 10 wherein the animation data memorized in the animation memory portion includes a near-distance viewing portion in which movement of articles around a take-off or landing place is drawn and an intermediate-distance viewing portion in which movement of clouds relative to continents and oceans is drawn.

15. A method for operating a planetarium picture-creating apparatus comprising the steps of:

memorizing in advance in a memory of said apparatus a plurality of texture image data expressing conditions of a surface of an object by relating them to a range of distances from a viewpoint to the object;

specifying a distance from the viewpoint to the object on the basis of a manual operation by an operator;

reading one of the texture image data corresponding to a distance specified;

determining an extent of an area occupied by the object in relation to the entire image, in accordance with the distance specified;

computing the position of a celestial body in real time; and, on the basis of texture image data read out, pasting a texture image to the area determined by adjusting a size while forming a remaining portion of the entire image as a real time image on the basis of a computation result relating to the position of the celestial body.

16. The method for operating a planetarium picture-creating apparatus according to claim 15 wherein the texture image data memorized in advance covers, of the entire surface of the object, a range capable of being seen from the viewpoint at a related distance.

17. The method for operating a planetarium picture-creating apparatus according to claim 15 wherein the texture image data memorized in advance has a degree of resolution that becomes lower commensurately with increases in a related distance.

18. The method for operating a planetarium picture-creating apparatus according to claim 15 wherein the texture image data memorized in advance includes
- near-distance earth image data in which scenes of streets on earth as an object are drawn;
- intermediate-distance earth image data in which the geographic forms on earth as an object are drawn; and
- far-distance earth image data in which shapes of continents and oceans on earth as an object are drawn.

19. A method for operating a planetarium picture-creating apparatus comprising:
- memorizing in advance in a memory of said apparatus animation data expressing conditions of a surface of an object extending from a view from a near distance to a view from an intermediate distance;
- specifying a distance from a viewpoint to the object on the basis of a manual operation by an operator;
- determining an extent of an area occupied by the object in relation to the entire image, in accordance with the distance specified;
- computing the position of a celestial body in real time;
- if the distance specified is within a range of a predetermined near-distance, creating a projection image from animation on the basis of animation data;
- if the distance specified is within a range of a predetermined intermediate-distance, on the basis of animation data, pasting animation to the area determined by adjusting a size while creating for a remaining portion of the entire image, a projection image as a real time image on the basis of a result of computation about the position of the celestial body;
- if the specified distance is within a range of a predetermined far-distance, creating a projection image on the basis of a result of computation about the position of the celestial body; and
- automatically switching the projection image of the near-distance, intermediate-distance and far-distance in accordance with the distance specified.

20. The method for operating a planetarium picture-creating apparatus according to claim 19 wherein animation data memorized in advance covers, out of the entire surface of the object, a range capable of being seen from a viewpoint at a given point in time.

21. The method for operating a planetarium picture-creating apparatus according to claim 19 wherein the animation data memorized in advance includes a near-distance viewing portion in which movement of articles around a take-off or landing place are drawn and an intermediate-distance viewing portion in which movement of clouds relative to continents and oceans are drawn.

* * * * *